US012762854B2

(12) United States Patent
Nykl et al.

(10) Patent No.: US 12,762,854 B2
(45) Date of Patent: Oct. 13, 2026

(54) DUAL OBJECT LOCALIZATION AND RELATIVE VECTORING

(71) Applicant: Government of the United States as represented by the Secretary of the Air Force, Wright-Patterson AFB, OH (US)

(72) Inventors: Scott Nykl, Kettering, OH (US); Clark Taylor, Beavercreek, OH (US); Derek Worth, Wright-Patterson AFB, OH (US); Jeffrey Choate, Wright-Patterson AFB, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 170 days.

(21) Appl. No.: 18/804,201

(22) Filed: Aug. 14, 2024

(65) Prior Publication Data

US 2026/0051164 A1 Feb. 19, 2026

(51) Int. Cl.
*G06T 7/73* (2017.01)
*G06T 7/70* (2017.01)
(Continued)

(52) U.S. Cl.
CPC ................ *G06V 20/17* (2022.01); *G06T 7/70* (2017.01); *G06V 10/25* (2022.01); *G06V 10/44* (2022.01); *G06V 10/761* (2022.01)

(58) Field of Classification Search
CPC ........ G06V 20/17; G06V 10/25; G06V 10/44; G06V 10/761; G06T 7/70
See application file for complete search history.

(56) References Cited

U.S. PATENT DOCUMENTS 7,377,468 B2 * 5/2008 Saggio, III ............. B64D 39/00 244/135 A
7,404,530 B2 * 7/2008 Saggio, III ............. B64D 39/00 141/382

(Continued)

FOREIGN PATENT DOCUMENTS

GB 2418186 A * 3/2006 ............. B64D 39/06

OTHER PUBLICATIONS

Jun Cheng, Real-Time and Efficient 6-D Pose Estimation From a Single RGB Image, IEEE Transactions on Instrumentation and Measurement, vol. 70, 2021 (Year: 2021).*

(Continued)

*Primary Examiner* — Philip P. Dang
(74) *Attorney, Agent, or Firm* — AFMCLO/JAZ; Larry L. Huston

(57) ABSTRACT

A method of determining an object-to-object vector. The method includes providing a camera on one of a first object having a first object docking member and a second object having a second object docking member. The camera captures a 2D image including the first object docking member and the second object docking member. A plurality of 2D image points are identified on the 2D image and matched to some of 3D features of the first object docking member and some of the 3D features of the second object docking member. Camera frame first and second object vectors are subtracted to determine a camera frame first object to second object vector.

17 Claims, 18 Drawing Sheets

(51) Int. Cl.

| | |
|---|---|
| ***G06V 10/25*** | (2022.01) |
| ***G06V 10/44*** | (2022.01) |
| ***G06V 10/74*** | (2022.01) |
| ***G06V 20/17*** | (2022.01) |

(56) References Cited

U.S. PATENT DOCUMENTS

| | | | | |
|---|---|---|---|---|
| 8,720,502 | B2 * | 5/2014 | Mouskis | B64D 39/06 141/382 |
| 10,332,294 | B2 * | 6/2019 | Black | G06T 11/00 |
| 11,386,633 | B2 * | 7/2022 | Liu | G06F 18/214 |
| 12,354,072 | B2 * | 7/2025 | Cella | B33Y 50/02 |
| 12,366,459 | B2 * | 7/2025 | Streem | G01C 21/005 |
| 12,387,363 | B2 * | 8/2025 | Suzuki | G06T 7/70 |
| 2017/0092109 | A1 * | 3/2017 | Trundle | B60L 53/305 |
| 2025/0329044 | A1 * | 10/2025 | McClintock | G06T 7/73 |

OTHER PUBLICATIONS

Jia Kang, YOL0-6D+: Single Shot 6D Pose Estimation Using Privileged Silhouette Information, © 2020 IEEE (Year: 2020).*

Cheng, Jun, et al; Real-Time and Efficient 6-D Pose Estimation form a Single RGB Image, IEEE Transactions Instrumentation and Measurement, vol. 70, 2021.

Huang, Wei-Lun, et al; Confidence-Based 6D Object Pose Estimation, IEEE Transactions on Multimedia, vol. 24, 2022.

Kang, Jia, et al; YOLO-6D+: Single Shot 6D Pose Estimation Using Privileged Silhouette Information, 2020 International Conference on Image Processing and Robotics (ICIP), 978-1-7281-6541 © 2020 IEEE.

Kehl, Wadim, et al; SSD-6D: Making RGB-Based 3D Detection and 6D Pose Estimation Great Again, 2017, ICCV Paper, Computer Vision Foundation, https://wadimkehl.github.io/.

Li, Congliang et al.; Simultaneous Multiple Object Detection and Pose Estimation Using 3D Model Infusion with Monocular Vision, Nov. 22, 2022, arXiv:2211.11188v2 [cs.CV].

Rad, Mahdi et al,; BB8: A Scalable, Accurate, Robust to Partial Occlusion Method for Predicting the 3D Poses of Challenging Objects without Using Depth, 2017, IEEE International Conference on Computer Vision, DOI 10.1109/ICCV.2017.413.

Sundermeyer, Martin, et al.; Implicit 3D Orientation Learning for 6D Object Detection from RGB Images, ECCV paper published by Computer Vision Foundation, 2018.

Tekin, Bugra, et al.; Real-Time Seamless Single Shot 6D Object Pose Prediction, 2018, IEEE/CVF Conference on Computer Vision and Pattern Recognition, Salt Lake City, UT, USA, doi: 10.1109/CVPR.2018.00038.

Xiang, Yu, et al.; PoseCNN: A Convolutional Neural Network for 6D Object Pose Estimation in Cluttered Scenes, 2018, arXiv:1711.00199v3 [cs.CV].

Worth, Derek, et al.; Relative Vectoring Using Dual Object Detection for Autonomous Aerial Refueling, 2021, Springer Nature Publication.

* cited by examiner

| 2D pts | ID | 3D pts |
|---|---|---|
| $(u_1, v_1)$ | $p_1$ | $(X_1, Y_1, Z_1)$ |
| $(u_2, v_2)$ | $p_2$ | $(X_2, Y_2, Z_2)$ |
| $(u_3, v_3)$ | $p_3$ | $(X_3, Y_3, Z_3)$ |
| $(u_4, v_4)$ | $p_4$ | $(X_4, Y_4, Z_4)$ |
| $(u_5, v_5)$ | $p_5$ | $(X_5, Y_5, Z_5)$ |
| $(u_6, v_6)$ | $d_1$ | $(X_6, Y_6, Z_6)$ |
| $(u_7, v_7)$ | $d_2$ | $(X_7, Y_7, Z_7)$ |
| $(u_8, v_8)$ | $d_3$ | $(X_8, Y_8, Z_8)$ |
| $(u_9, v_9)$ | $d_4$ | $(X_9, Y_9, Z_9)$ |

Table 1 Intrinsic camera parameters.

| | |
|---|---|
| Resolustion | 2048x1080 |
| Horiz. FOV (hFOV) | 15, 25, 55, and 75 degrees |
| Dist. coeffficients | zeroes (no distortion) |
| Optical center | $c_x, c_y$ = (1024.0, 540.0) pixels |
| Focal length | $f_x = f_y = \frac{c_x}{\tan(hFOV/2)}$ pixels |

FIG. 18

Table 2 Platform configuration.

| Enviornment Setting | Version/specification |
|---|---|
| Computer (laptop) | Lenova ThinkPag P15 |
| Operating system | Windows 10 (64-bit) |
| Processor | Intel Core i9-11950H |
| Memor (RAM) | 128GB |
| Disk storage | 1TB |
| GPU | Nvidia RTX A5000 |
| Nvidia CUDA | v11.7 |
| OpenCV (with cuDNN) | v.4.6.0 |
| OpenGL | v4.3 |
| YOLOv5 model format | .onnx, exported from .pt |

FIG. 25

Table 3: Method execution time

| **Method operation** | **Duration** |
|---|---|
| Virtual image capture | 18 ms |
| YOLO prediction | 22 ms |
| Pre-processing (making predictions) | 19-21 ms |
| pad image (into square) | 2 ms |
| blob from image | 4-5 ms |
| network forward propagation | 13-14 ms |
| Post-Processing (interpreting predictions) | <1 ms |
| Reminder of method | <1 ms |
| **Total** | **41 ms** |

FIG. 26

DUAL OBJECT LOCALIZATION AND RELATIVE VECTORING

RIGHTS OF THE GOVERNMENT

The invention described herein may be manufactured and used by or for the Government of the United States for all governmental purposes without the payment of any royalty.

TECHNICAL FIELD

The present disclosure relates to dual object localization for autonomous manipulation of two objects. More particularly, the present disclosure relates to dual object localization related to docking of two objects, such as in autonomous aerial refueling of aircraft.

BACKGROUND

Many technical challenges arise when independently controlled objects are to be manipulated relative to their two positions. In addition to identifying two (or more) objects in space and determining their relative position and orientation (also known in the literature as relative pose), additional technical challenges arise related to how to autonomously bring them together, that is, how to dock, join, connect, or otherwise functionally link the objects. For example, docking of spacecraft to support vehicles, docking of electric vehicles to power supplies, manipulating robotic arms for parts placement, and the like, require that two objects be identified, located, brought into proximity and contacted, joined, or docked for functional operation. Air-to-air refueling of aircraft is one application of dual object localization and docking.

BRIEF DESCRIPTION OF THE DRAWINGS

The following detailed description of embodiments of the present disclosure can be best understood when read in conjunction with the drawings enclosed herewith:

FIG. 18 is a table of example of representative intrinsic camera properties;

FIG. 25 is a table showing an example platform configuration;

FIG. 26 is a table of showing an example method execution time.

Figure 1:
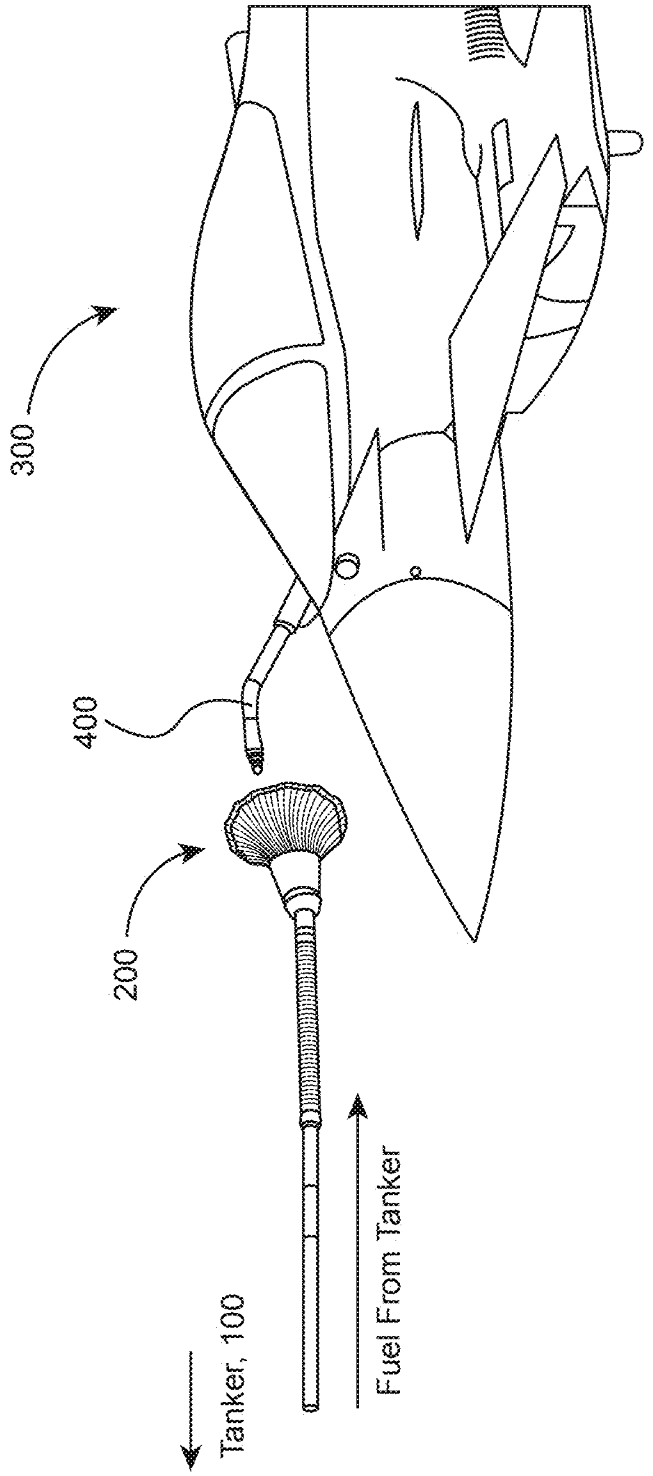
FIG. 1 is a perspective view of select components of a prior art air-to-air refueling system.

The embodiments set forth in the drawings are illustrative in nature and not intended to be limiting. Moreover, individual features of the drawings and the disclosure will be more fully apparent and understood in view of the detailed description.

DETAILED DESCRIPTION

Various non-limiting embodiments of the present disclosure will now be described to provide an overall understanding of the principles of the structure, function, and use of the apparatuses, systems, methods, and processes disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to “various embodiments,” “some embodiments,” “one embodiment,” “some example embodiments,” “one example embodiment,” or “an embodiment” means that a particular feature, structure, or characteristic described in connection with any embodiment is included in at least one embodiment. Thus, appearances of the phrases “in various embodiments,” “in some embodiments,” “in one embodiment,” “some example embodiments,” “one example embodiment, or “in an embodiment” in places throughout the specification are not necessarily all referring to the same embodiment. Furthermore, the particular features, structures or characteristics may be combined in any suitable manner in one or more embodiments.

The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific FIG. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

The present disclosure relates generally to dual object localization for purposes of producing a relative vector enabling autonomous docking of two objects. Applications and technologies benefiting from the advance described in the current disclosure include industrial, medical and military applications. The following examples are intended to be illustrative, and not limiting. Underwater operations of submarines and other submersibles could utilize dual object localization for submersible docking or guiding autonomous underwater vehicles, or to permit joining to towed underwater docking stations or habitats. Precise surgical operations, including robotic and autonomous operations, rely on precise location of objects such as scopes, surgical tools, tissues and organs. Landscaping operations involve landscaping vehicles operating in the vicinity of other objects, including things and people, to be navigated to or around. Industrial cleaning, such as carpet cleaning, relies on objects such as vacuums, including vacuum robots, locating, identifying, and either engaging or avoiding other objects, such as stairs and household objects. Maritime operations include transferring cargo, passengers, or data at sea, often involving at least one moving object, e.g., a ship's deck and/or a helicopter. Ships and docks, including floating docks and rigs often require docking. Self-driving cars can benefit from autonomous docking with a charging station or guidance for parking. Aircraft often require the ability to perform austere landings, where location and guidance between landing gear and a runway can be critical for safety. Robotics, including industrial, medical, space, and military applications, can often require the precise movement and navigation of robotic arms and parts to be manipulated.

In each of the example scenarios mentioned above, at one level the problem becomes how to identify two discrete objects and to develop a relative vector between the two objects to permit navigation and movement to functionally join them together. For example, an autonomous underwater vehicle (AUV) may need to dock with a docking station for power transfer and/or charging. The AUV has a first object, i.e., a docking probe or a docking port. The docking station has a second object, a complementary docking port or docking probe, respectively. For functional operation, the two objects need to be identified, navigated, and functionally linked. While the system and method for dual object localization can be used for any two-object problem, the development described in the disclosure herein is illustrated in the context of air-to-air refueling. In an example embodiment, at least one of the two aircraft involved is autonomous. Further, while the disclosed example involves "probe to drogue" refueling, the disclosure is equally applicable to aerial boom systems as well.

Figure 2:
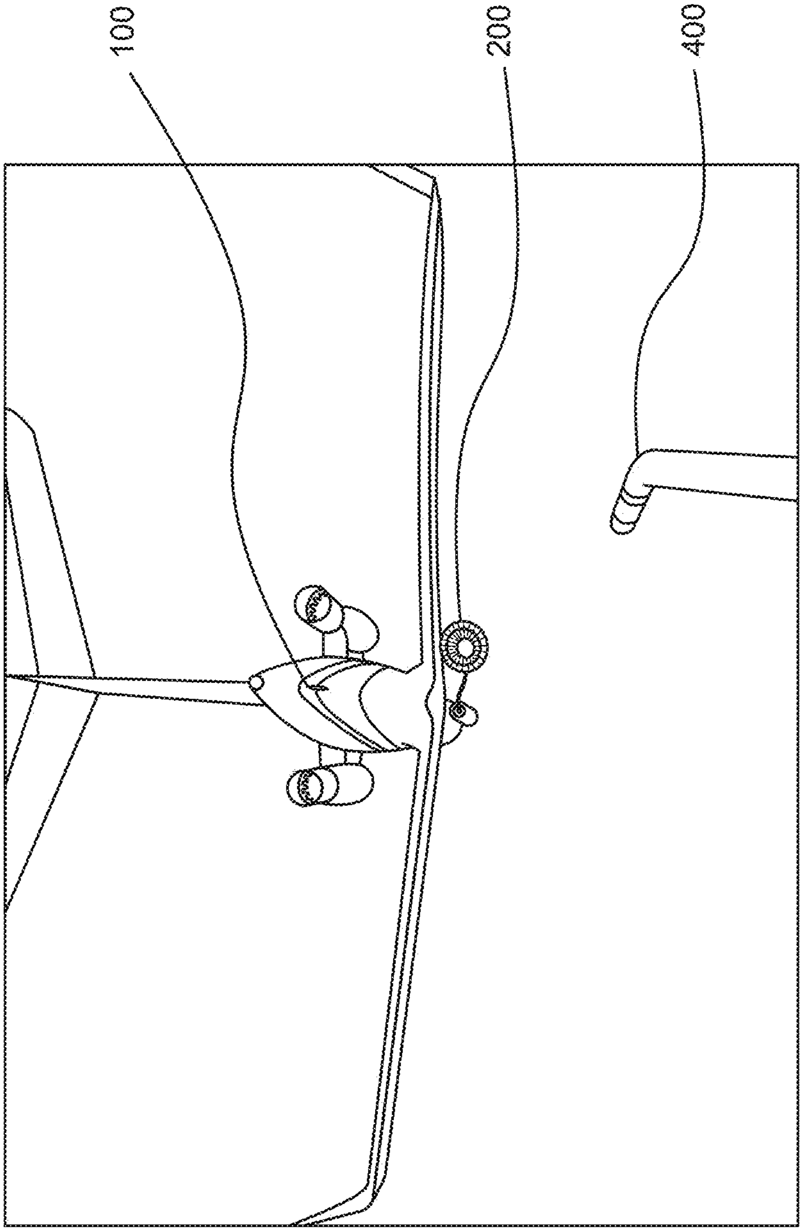
FIG. 2 is a perspective view of select components of a prior art air-to-air refueling system.
Figure 3:
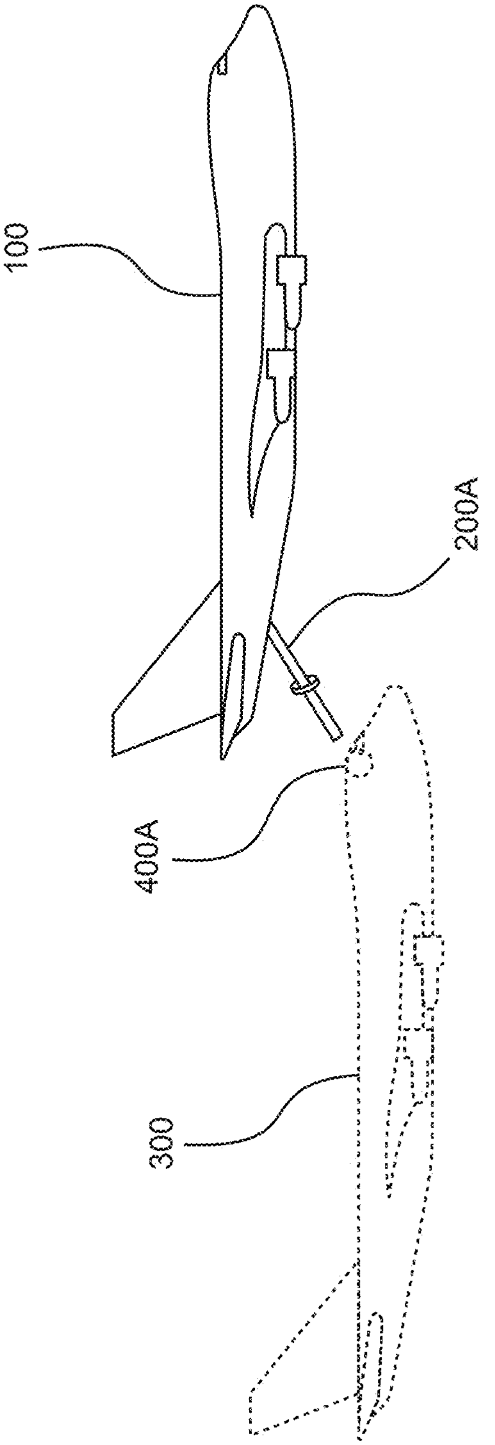
FIG. 3 is a perspective view of select components of a prior art air-to-air refueling system.

Air-to-air refueling (AAR) is a challenging but critical operation that involves transferring fuel from a tanker aircraft 100 to a receiving aircraft 300 while both are in midair. There are two main systems used for aerial refueling: the aerial boom system and the probe-to-drogue (PtD) system. The present disclosure relates primarily to PtD systems but can be utilized in aerial boom systems as well. As illustrated in FIGS. 1 and 2, in PtD systems, a tanker aircraft 100 (shown in FIG. 2) flies straight and level and extends a flexible hose with a basket on the end, called a drogue 200, that trails out behind and below the tanker aircraft 100. In the context of this disclosure, the drogue can be a first object to be localized. The receiving aircraft 300 extends a rigid probe 400 that docks with, i.e., plugs into, the basket of the drogue 200. In the context of this disclosure, the probe can be a second object to be localized. Once the probe 400 is securely engaged with the drogue 200, fuel flows from the tanker aircraft 100 through the flexible hose to the receiving aircraft 300. FIG. 3 illustrates a typical aerial boom refueling arrangement, in which the receiving aircraft 300 has a receiving port 400A as a first object, and the tanker aircraft 100 extends a boom 200A as a second object.

From the receiving aircraft 300 pilot's point of view, as depicted in FIG. 2, it is important that both the probe 400 and the drogue 200, as first and second objects of interest, are visible in the same frame of reference. Currently, with pilot-flown aircraft, the pilot can simultaneously see both the probe 400 and the drogue 200 to guide the two objects together, referred to as a pose estimation. The pilot exercises human sensing capabilities to extract pose information from the environment. The sensing and pose estimation must be accurate, reliable, and achieved in real time to achieve the dynamic needs of the aerial refueling process.

Autonomous AAR requires that an autonomous flight control agent navigate at least one of the tanker aircraft 100 or the receiving aircraft 300 and dock for aerial refueling. Thus, an autonomous flight control agent must receive, analyze, and respond to the dynamic pose estimation and sensing capabilities similarly to the way a human pilot would. As described herein, the approach of the present disclosure overcomes problems with present sensing technologies, such as GPS, inertial navigation systems composed of IMUs (magnetometers, gyroscopes, and accelerometers), and other various navigations techniques. For example, GPS can be jammed or denied, IMUs are inherently noisy and drift over time, and current vision algorithms do not simultaneously meet the accuracy, reliability, and execution speed requirements to achieve The present disclosure describes a solution for autonomous AAR that overcomes the shortcomings of previous attempts. The present disclosure describes a method and system for a computer vision solution for finding relative vectoring using dual object detection. The system can consistently convert image data to relative position estimates accurate to less than 3 cm of error at contact, relative orientation estimates of less than 1 degree, and runs in real time on a laptop computer. In an embodiment, the system runs at greater than 45 Hz on a laptop with an Nvidia RTX A5000 GPU.

The system and method of the present disclosure does not rely on extrinsic camera properties. For example, the camera of the system does not need to be "bore sighted" and fixed without movement to be utilized effectively. For example, a camera mounted and sighted can be bumped, shifted, and otherwise moved out of the sighted position, and still work in the system and method of the disclosure as long as it can image the two objects of interest. As used herein, the term "camera" is utilized to describe any vision sensor capable of imaging the two objects of interest. Cameras can include any image capture device capable of sensing visible range wavelengths, as well as IR longwave, medium wave and shortwave thermal wavelengths.

While two or more cameras can be utilized in the system and method of the disclosure, one camera is sufficient. Relative vectoring between two objects involves a relative position and orientation between the two bodies. As long as at least one camera is located to image both objects of interest, relative vectoring can be performed. For example, in addition to the embodiments disclosed in which one camera is mounted on either of two aircraft, the camera could be hovering on a third vehicle, floating in space, or change locations during its observations. If more than one camera is utilized in the method and system of the disclosure, then multiple estimates can be obtained simultaneously, contributing to a decrease in overall estimation error.

The methodology disclosed achieves results that are resilient to occlusions and produces relative position and orientation (pose) predictions and a relative vector from images containing both the receiving aircraft 300's refueling probe 400 tip and the refueling drogue 200. The method and system of the present disclosure reframes the AAR problem of "drogue 200 pose estimation relative to the vision sensor (camera)" to that of "drogue 200 pose estimation relative to the probe 400." As explained herein, one benefit of this difference is that it removes the problems associated with extrinsic camera properties and mitigates any challenges relating to automating detection and tracking of an object (i.e., the drogue 200). This method can be referred to as utilizing "relative vectoring" to determine a vector between two objects to be functionally joined.

Relative vectoring overcomes dependencies on extrinsic camera calibrations by, for example, providing the receiving aircraft 300 direction and distance, computed in its own local reference frame, to its target, i.e., to the drogue 200, without any reference to, or awareness of, extrinsic camera properties. This methodology exploits dual object detection (DOD) and reference frame transformations. DOD is used with Solve PnP functions on features of two separate 3D objects in the same 2D image, as discussed in more detail herein. Solve PnP estimates an object pose given a set of object points and their corresponding image projections. Solve PnP returns the rotation and the translation vectors that transform a 3D point expressed in the object coordinate frame to the camera coordinate frame. In an embodiment, cv::SolvePnPRansac can be utilized.

Figure 4:
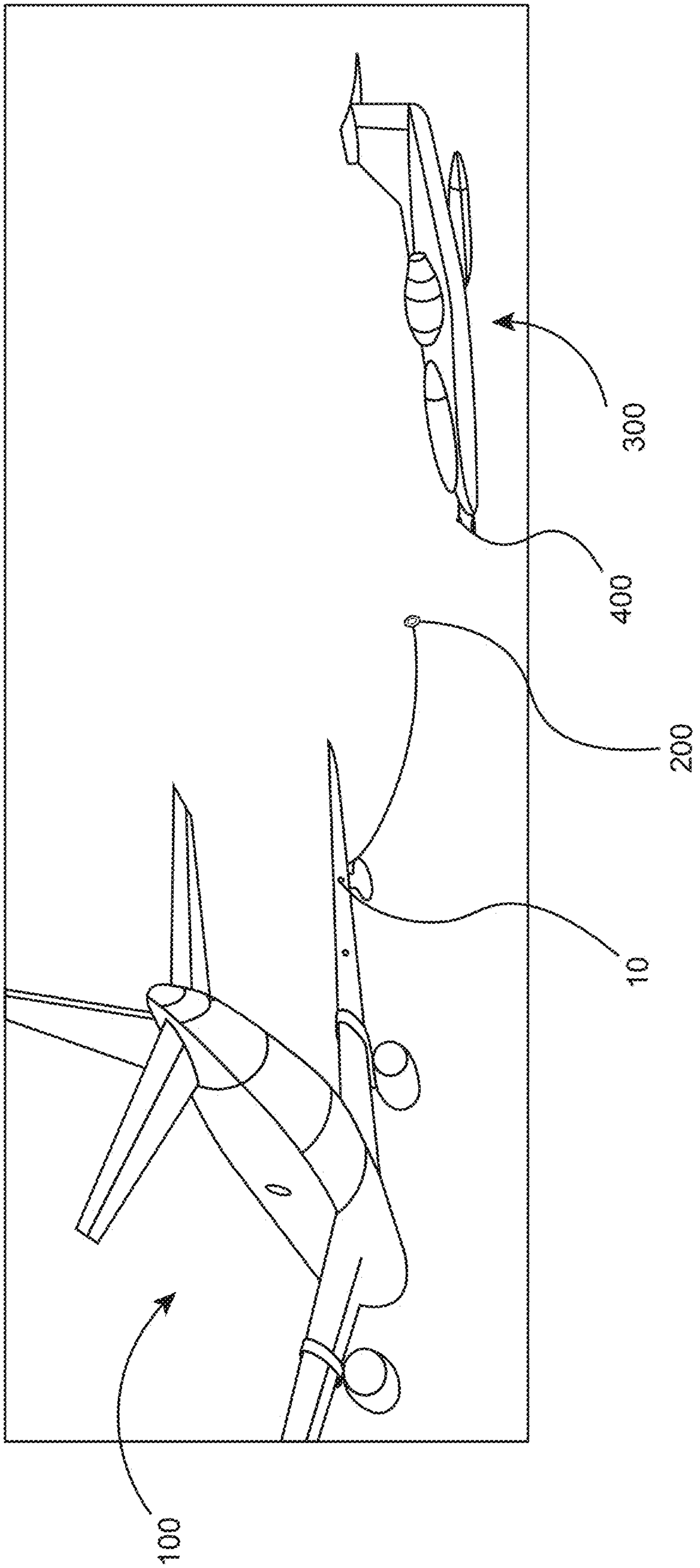
FIG. 4 is a perspective view of select components of an air-to-air refueling system.

Referring to FIG. 4, the method and system utilizes a camera 10 that produces an image that includes at least two 3D objects. In the embodiment illustrated in FIG. 4, the camera 10 is mounted on the tanker aircraft 100 in a rear-facing orientation and the 3D objects of interest are the drogue 200 basket and the probe 400 of the receiving aircraft 300. In other embodiments, as disclosed below, for example with reference to FIGS. 16 and 17, the camera 10 is mounted on the receiving aircraft 300, and the 3D objects of interest are the probe 400 and drogue 200 basket from the tanker aircraft 100.

Figure 5:
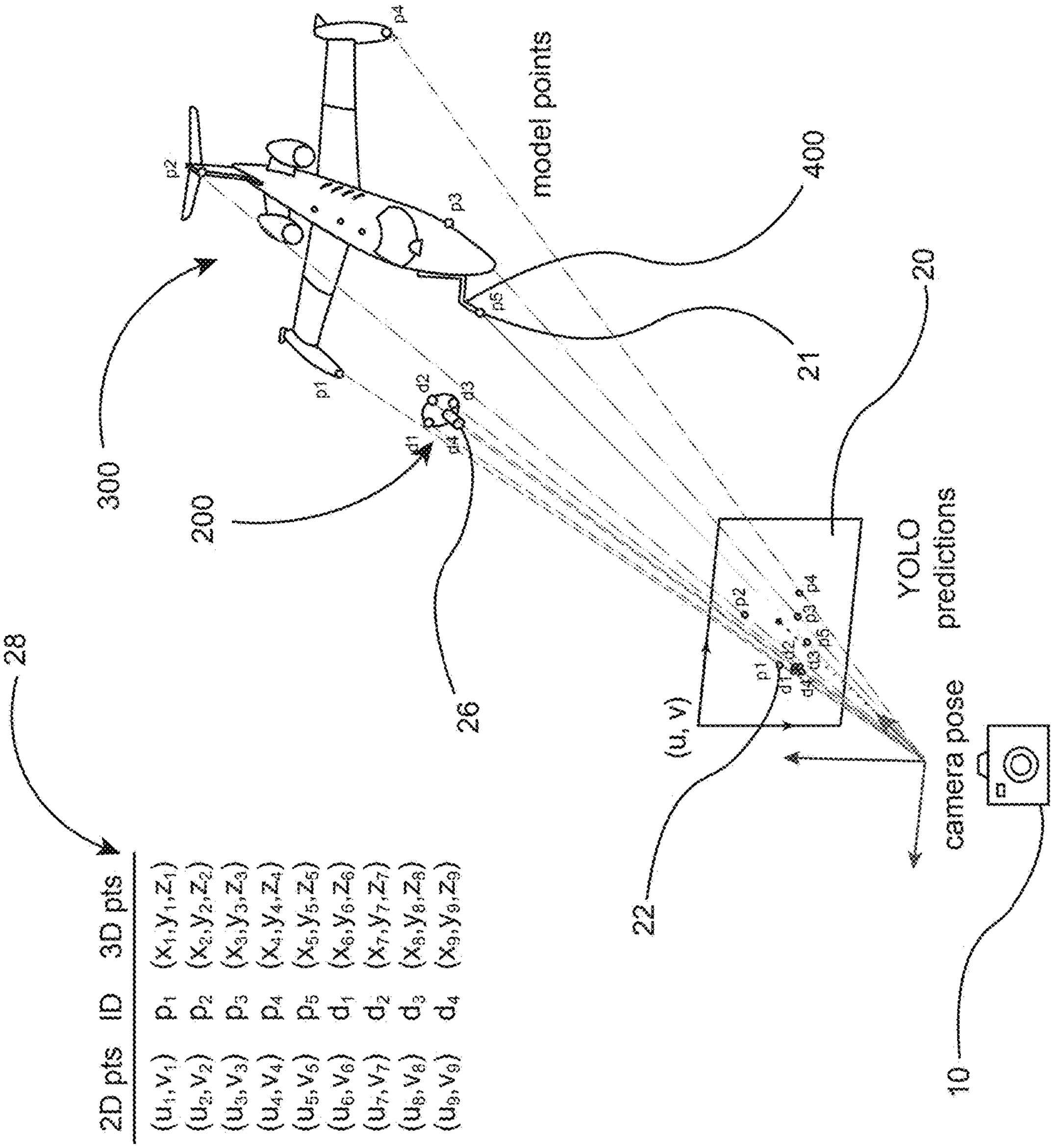
FIG. 5 is a schematic diagram of a representative image capture and point matching methodology.
Figure 6:
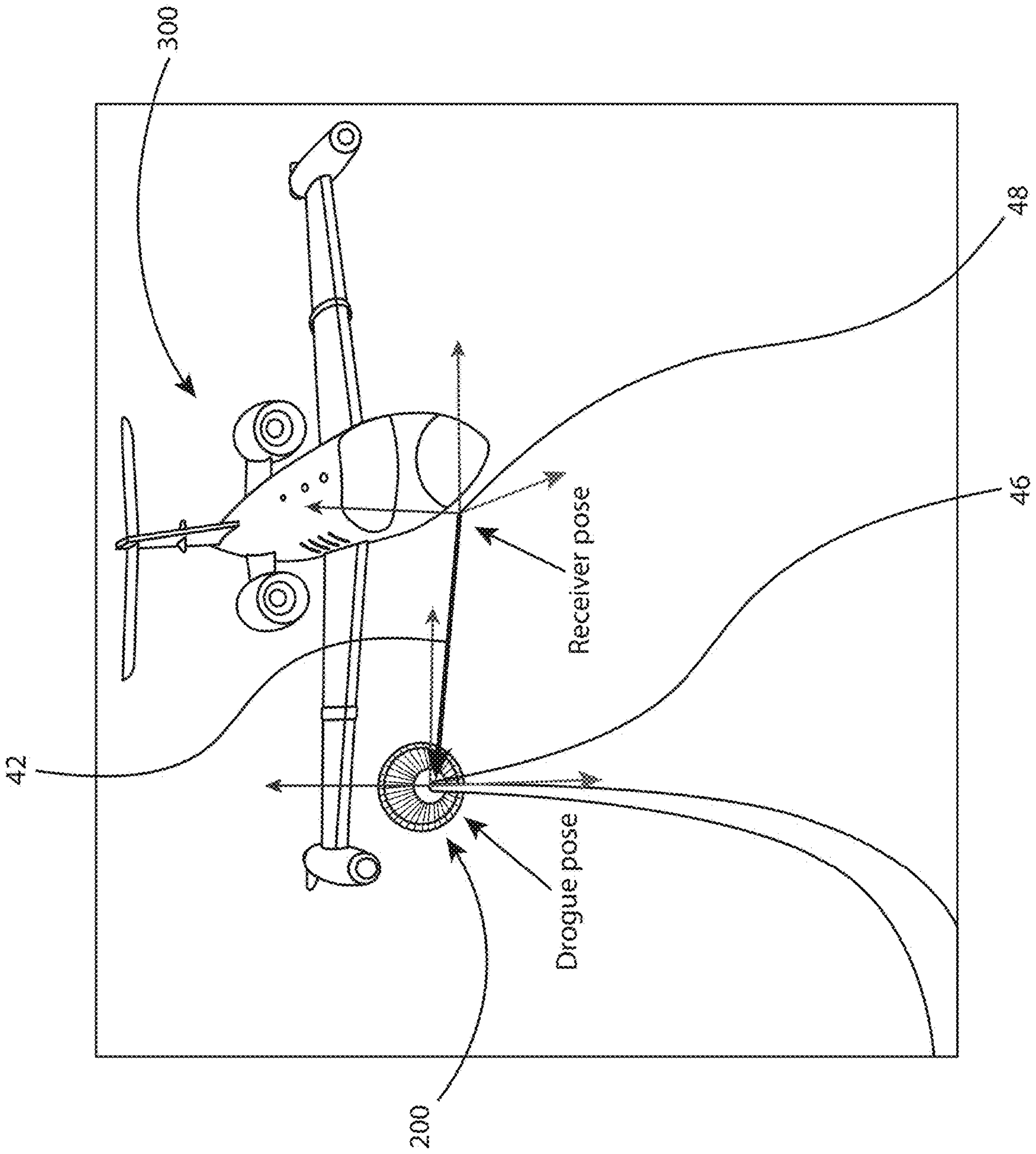
FIG. 6 is perspective view of an example of a bonded pair of 6 degrees-of-freedom (DoF) pose estimations.
Figure 7:
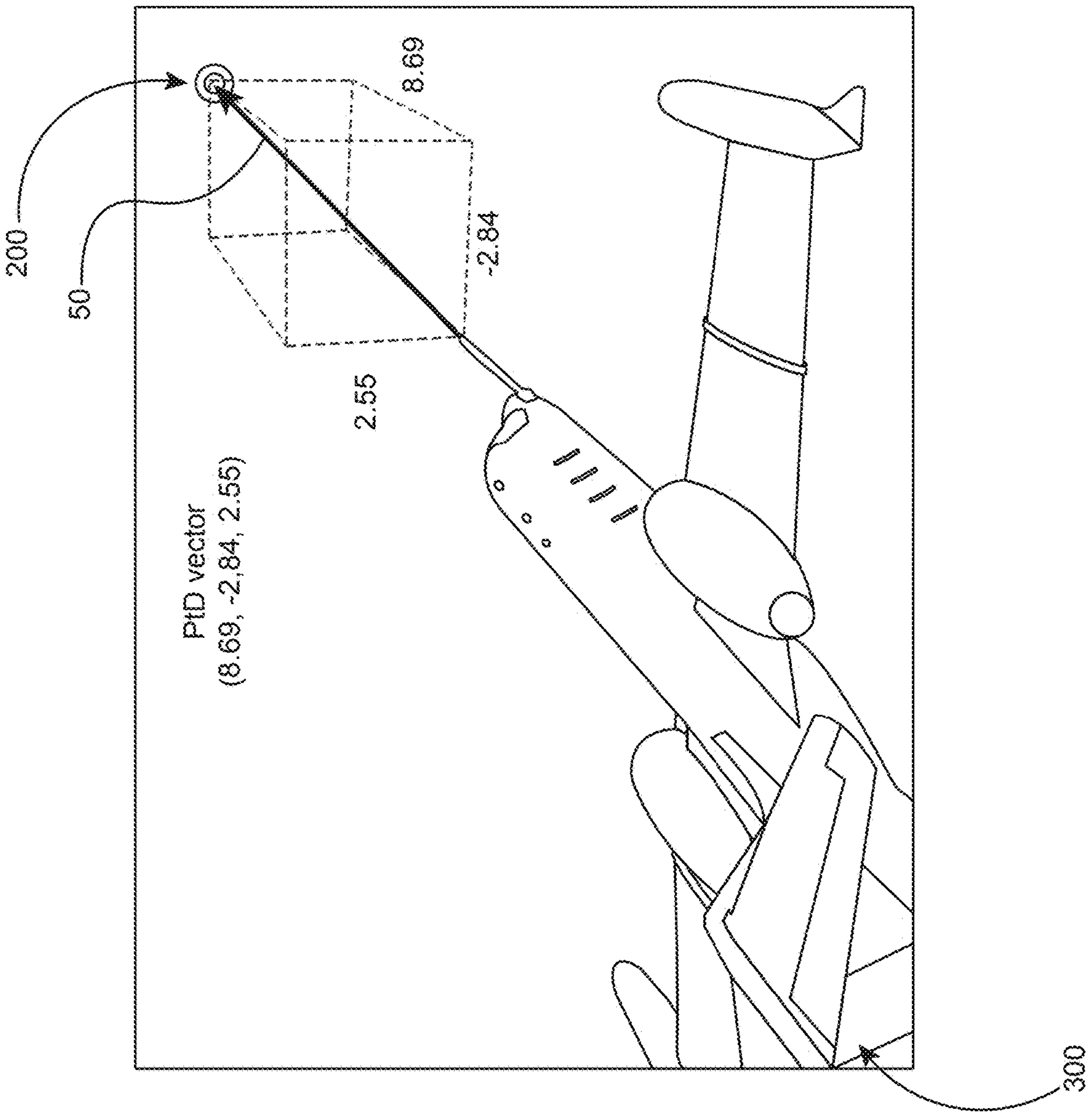
FIG. 7 is a perspective view of a computed relative vector between two objects.

Referring to FIGS. 5-7, there is depicted an overview of a system and method for dual object localization and relative vectoring in the context of probe to drogue docking. A 2D image 20 captured by a camera 10 includes two 3D objects of interest: the drogue 200 and the probe 400 of the receiving aircraft 300. As discussed more fully below, in an embodiment, You Only Look Once (YOLO) real-time object detection software detected 3D object points two objects of interest correlated to specific 2D image points 22 on image 20, namely object points 24 on the probe 400 and/or the receiving aircraft 300, as well as object points 26 on the probe 400. In an embodiment, YOLOv5 can be utilized. Model point matching, an example of which is schematically shown at table 28 in FIG. 5, can be achieved by YOLO software, which can predict class IDs. For example, in the example shown, p1-p5 represent object points 24 on the probe 400 object and d1-d4 represent object points 22 on the drogue 200 object. These matches are passed to perspective-n-point, e.g., Solve PnP, which uses them to transform the 3D object points for pose estimations including a pair of rotation matrices and translation vectors defined relative to the camera in a bonded pair of 6 degrees-of-freedom (DoF) poses. For example, as shown in FIG. 6 a first pose estimation 46 for the drogue 200 and a second pose estimation 48 for a probe 400 can be produced. As discussed in more detail below, the resulting pose estimations are used to produce and subtract a camera frame probe vector from a camera frame drogue vector resulting in a camera frame probe to drogue (PtD) vector 42 between the two objects, which can then be rotated into the receiver's local reference frame to produce receiver frame PtD vector 50, as depicted with three representative coordinates in FIG. 7.

Figures 8, 9, 10, 11, 12, 13, 14:
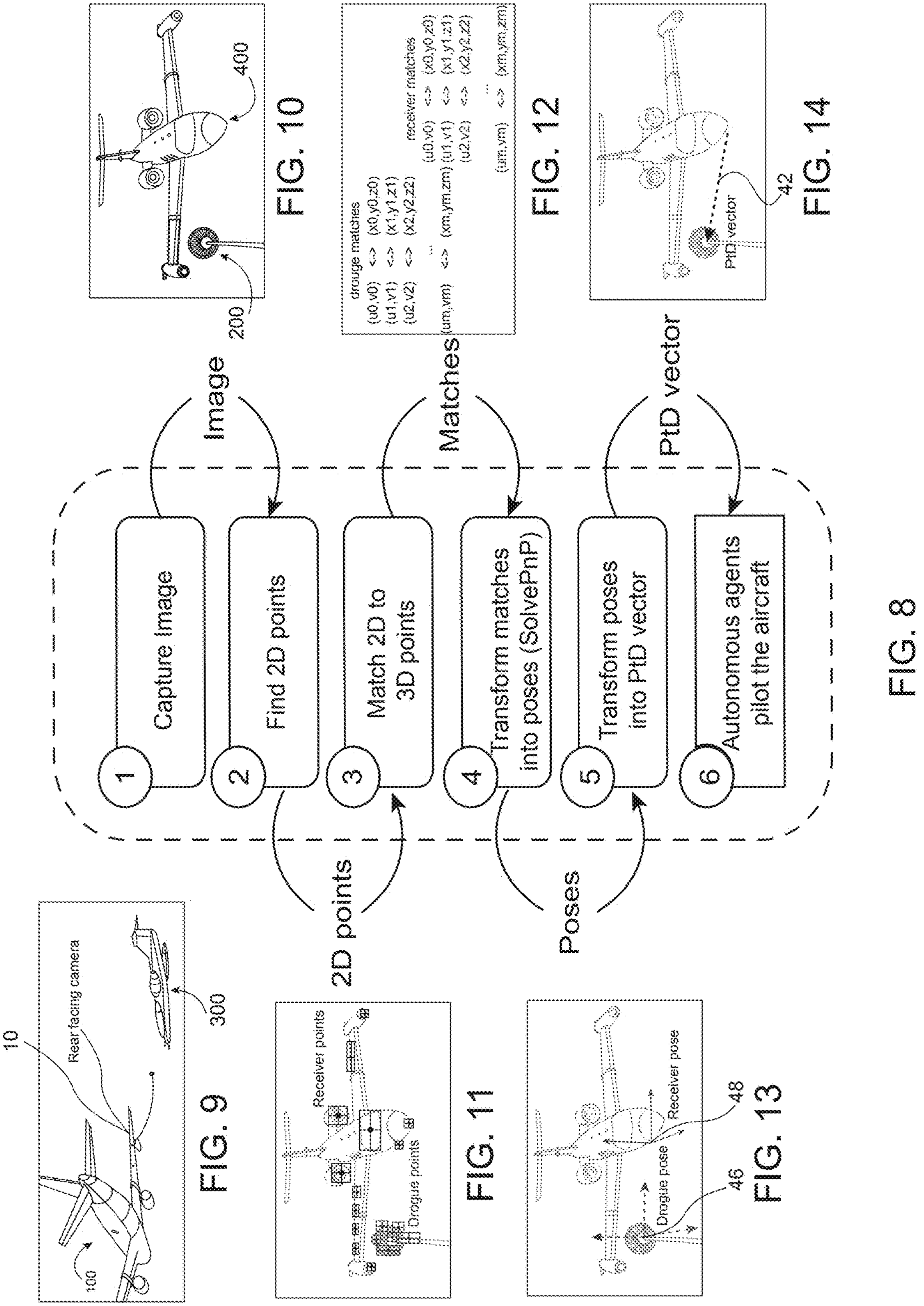
FIG. 8 is a flow diagram of a representative method and system of the disclosure.
FIG. 9 is a perspective view of select components of an air-to-air refueling system.
FIG. 10 is a perspective view of a representative image capture of a receiving aircraft and a drogue basket.
FIG. 11 is a perspective view of a receiving aircraft and a drogue basket with representative object points indicated.
FIG. 12 is a schematic diagram showing representative analysis of object point matching.
FIG. 13 is a perspective view of a receiving aircraft and a drogue basket indicating relative pose estimations.
FIG. 14 is a perspective view of a receiving aircraft and a drogue basket showing a relative vector between a probe and a drogue.

With reference to the flow diagram of FIG. 8 and the accompanying FIGS. 9-14, and as well with reference to FIGS. 15-19, an example simulated embodiment of the method and system of the disclosure is described in more detail. At Step 1, a camera captures a 2D image containing two 3D objects of interest, in the illustrated example, a probe and drogue. FIG. 9 depicts the rear-facing camera 10 of a tanker aircraft 100 that captures an image shown in FIG. 11. At Step 2, machine learning is used to detect 3D object points, as depicted in FIG. 11. The 3D object points are turned into probe-to-drogue vector predictions. At Step 3, an algorithm, as discussed more fully below, with results depicted schematically in FIG. 12, is applied to match 2D image points to relative 3D object points. At Step 4, a perspective-n-point algorithm transforms used the matched points into object pose estimations, as shown in FIG. 13. At Step 5, the object poses are converted into a relative PtD vector, as depicted in FIG. 14, which can be rotated into the receiver's estimated local reference frame as PtD vector 50, depicted in FIG. 7. At Step 6, autonomous agents pilot one or both aircrafts for AAR using a PtD relative vector.

Figure 15:
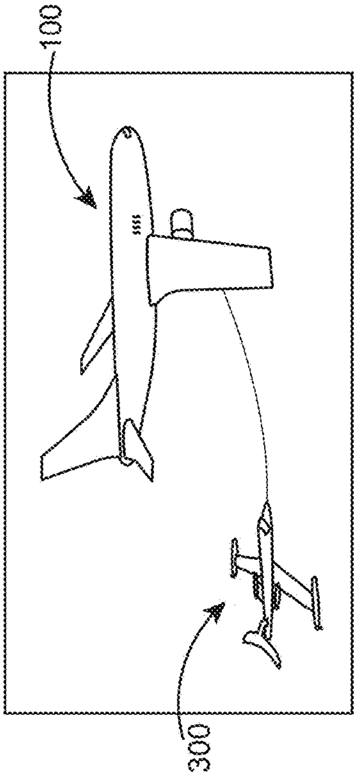
FIG. 15 is a perspective view of select components of an air-to-air refueling system.
Figure 16:
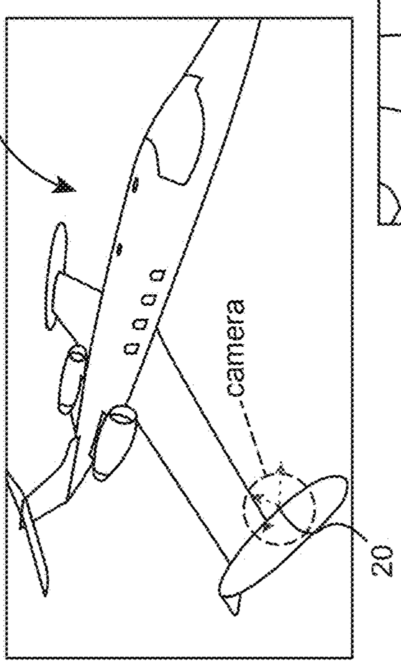
FIG. 16 is a perspective view of a receiving aircraft with a wing-mounted camera.

The steps of the flow diagram of FIG. 8 are discussed in more detail in the context of an example embodiment. In a simulated example, a receiving aircraft 300 approaches a tanker aircraft 100 for refueling, as depicted in FIG. 15. A wing-mounted forward-facing camera 20 is utilized on the receiving aircraft 300, as depicted in FIG. 16, to produce the image 20 depicted in FIG. 17. In any example or simulation, the captured image 20 includes at least two objects, in this example, the drogue 200 and a probe 400. The camera 10 can also image either the tanker aircraft 100 (for forward-facing cameras) or receiving aircraft 300 (for rear-facing cameras).

The camera 10 for the example simulation is chosen in view of trade-offs in computer vision characteristics, including pixel density, aspect ratio, distortion effects, fields of view, ISO, shutter speed, aperture, exposure, lighting conditions, and vantage point. For example, higher resolution images may reveal more information about the scene to potentially increase system accuracy and reliability, but also requires more computational resources and ultimately detracts from real time execution. Table 1 shown in FIG. 18 summarizes the camera parameters used.

In the example simulated embodiment, the camera feature trade-offs were handled by assuming no lens distortion, i.e., perfect intrinsic calibrations in which all subjects in the image are in focus regardless of distance from the camera. Also, the camera fields of view were varied during different phases of the aerial refueling approach to maximize the spread of features across the pixel space. Because real cameras with variable zoom have infinitely many zoom levels, each requires an independent intrinsic camera calibration. In the example embodiment, for example, the method described by Zhang was utilized to restrict our simulated cameras to static discrete horizontal fields of view (hFOV). (Zhang Z (2000) *A flexible new technique for camera calibration*. IEEE Transactions on pattern analysis and machine intelligence 22 (11): 1330-1334). These conditions could be reproduced and implemented in real world scenarios with separate cameras operating in parallel, each with their own fixed intrinsic parameters. Since the main objects detected in the image frame (i.e., aircraft) are mostly short and wide, rather than tall and narrow, a 2K resolution with a relatively wide aspect ratio of 1.90:1 was used for all cameras.

Additionally, current aircraft designs motivated the simulated camera positions. For example, cameras could be mounted relatively more easily inside the cockpit or on detachable static wing pods in the real world, while other locations such as those involving difficult-to-route power and data links or those on moving parts and flight critical aerodynamic surfaces are relatively less easily mounted. In the illustrated embodiment, the two primary camera locations on the receiving aircraft 300 were forward facing on the probe side wing pod (see FIG. 18) and inside the cockpit (not shown). Other simulations involved a rear facing camera mounted on a tanker aircraft 100 buddy pod next to the drogue hose feed port.

Software simulation included a high-fidelity simulator to implement the cameras to model realistic aerial refueling scenarios and render corresponding camera imagery needed for testing the relative vectoring system. AftrBurner® computer graphics 3D Visualization Engine simulator was selected, as it produces realistic and undistorted 2D camera imagery of 3D objects with corresponding truth data for system validation. AftrBurner includes an integrated camera modeling and OpenGL-based rasterizer, which takes advantage of ray casting and 3D rendering on 2D image spaces using traditional coordinate system transformations, as described in "Learn OpenGL" ((2015) Coordinate systems, (URL https://learnopengl.com/Getting started/Coordinate-Systems.) and depicted graphically in FIG. 16. AftrBurner also provides precise control over position and orientation of world objects, enabling implementation of complex and dynamic scenarios.

Figure 17:
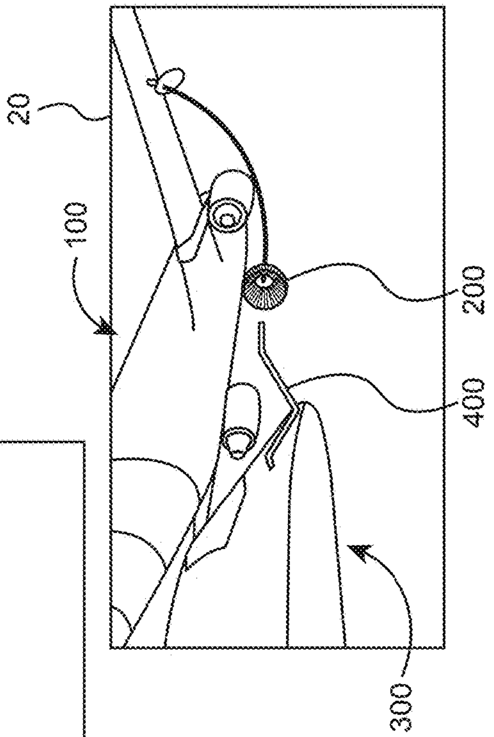
FIG. 17 is a perspective view of select components of an air-to-air refueling system as viewed from a receiving aircraft wing-mounted camera.

Five primary components implemented in simulations included the receiving aircraft 300 (with attached refueling probe 400), the camera (implemented as a frame buffer object with the intrinsic parameters listed in Table 1, FIG. 18), the tanker aircraft 100, and the drogue 200 basket-all imported as static models from OBJ files. The fifth object was a flexible drogue hose with dynamic indexed geometry connecting the drogue 200 to the tanker aircraft 100, allowing AftrBurner to facilitate simulation of an accurate drogue dynamics model from actual camera configurations. FIG. 15 shows the simulation with the tanker aircraft 100 and receiving aircraft 300 flying in an aerial refueling echelon formation. In the simulation, a camera 20 is mounted on the right wing of the receiving aircraft 300, as shown in FIG. 16, such that it can capture a realistic image, as shown in FIG. 17, containing both receiving aircraft 300 and tanker aircraft 100 features, including the probe 400 and the drogue 200 basket, during approach. The image of FIG. 17 corresponds to, and is another example of, the image capture of Step 1 of flow diagram of FIG. 8.

In the simulated embodiment of the method and system, the drogue 200 flopped around with turbulence and other wind effects in simulation as it would during a real refueling scenario. These objects were scaled in simulation to real world dimensions. Corresponding to Step 2 of the flow diagram of FIG. 8 and illustrated in FIG. 11, a digital twin is produced by rendering realistic scenes from imported textures and OBJ files, projecting true 3D points corresponding to object features as 2D points in synthetic imagery, and precisely modeled object orientation and movement within a common world reference frame. In a simulated embodiment, the receiving aircraft 300 approaching the drogue 200 basket extended behind a tanker aircraft 100 flying straight and level (and while performing banking maneuvers) was modeled, as indicated in FIGS. 15-17.

The simulated method utilized Monte Carlo simulations and analysis during the simulated example embodiment. During real aerial refueling operations, the receiving aircraft 300 typically begins its approach behind and from below, gradually climbing to match the tanker aircraft's 100 altitude, all the while chasing a centerline approach that aligns its probe 400 tip laterally and vertically with the drogue 200 basket center. Therefore, in the simulated embodiment of the method and system of the disclosure, similar approaches were modeled in this effort. Rather than implementing a complex flight dynamics model to replicate this behavior, a simple relative motion model was applied in which the receiving aircraft 300 is always positioned at a dynamic 6DoF pose offset from the origin of a local reference frame centered at the average drogue 200 location, with the x, y, and z components of this reference frame pointing in the tanker aircraft 100 forward, left, and up directions respectively (see FIG. 19). In other words, if the drogue 200 was stationary relative to the tanker, this origin would coincide with the drogue 200 center. The receiving aircraft 300 "flies" by updating this dynamic offset with the system-generated PtD vectoring and incremental rotations.

Multiple approaches were modeled as follows: The receiving aircraft 300 was initialized with a random pose—the dynamic pose offset set to a random position within a specific range behind the drogue 200 and an orientation set to match that of the tanker. Then, the was pose randomly perturbed between ±10, ±15, and ±45 degrees yaw, pitch, and roll respectively. Once initialized, the approach would proceed by following a true PtD vector computed in the receiving aircraft 300's local reference frame such that the receiving aircraft 300 moved in the direction of the vector with a convergence along the y (lateral) and z (vertical) components approximately twice as fast as that of the x (forward) component. Simultaneously, applied spherical linear interpolation was applied over quaternions to the pose offset to model the receiving aircraft 300's controlled rotation corrections, which gradually converged to match the tanker aircraft's orientation. This process produced simple, yet convincingly realistic aerial refueling approaches that imitate the behavior of an actual receiving aircraft 300 chasing a drogue 200 as it "flops" around behind the tanker aircraft 100. This process was continued until contact was made, which was defined as less than 1 cm Euclidean distance between the probe 400 tip and drogue 200 center. After contact, the receiver would reinitialize and start over with a new random position and orientation. This process was repeated continuously throughout all simulation experiments and data collections.

As indicated at Step 3 of the flow diagram of FIG. 8 mapping between 2D image points and corresponding 3D object points is one stage in the relative vectoring method and system of dual object detection. Automating accurate 2D image point detection was accomplished using a camera pinhole model, such as that developed by Tomasi (see, A simple camera model. Notes from computer science 527. URL https://courses.cs.duke.edu//fall16/compsci527/notes/camera-model.pdf). To ensure accuracy, reliability, and speed, machine learning was employed. Specifically, object detection using You Only Look Once (YOLO) real-time object detection algorithm for machine learning was utilized.

YOLO was trained to find 2D points of interest. Machine learning algorithms such as YOLO excel at simultaneous localization and categorization of multiple objects in an image, including predicting 2D bounding boxes, and can do this in real time. YOLO can find the 2D image points needed for the simulation of the present method and system. Many different versions and modifications to the YOLO algorithm exist, including YOLO MDE and YOLO-6D+ which both perform depth and pose estimation directly. However, the one used in the simulation effort of this disclosure was the unaltered Ultralytics YOLO PyTorch implementation available from Ultralytics (2022) YOLO in PyTorch. (URL https://github.com/ultralytics/YOLO). PyTorch is a fully featured framework for building deep learning models, which is a type of machine learning that's commonly used in applications like image recognition and language processing.

Figure 19:
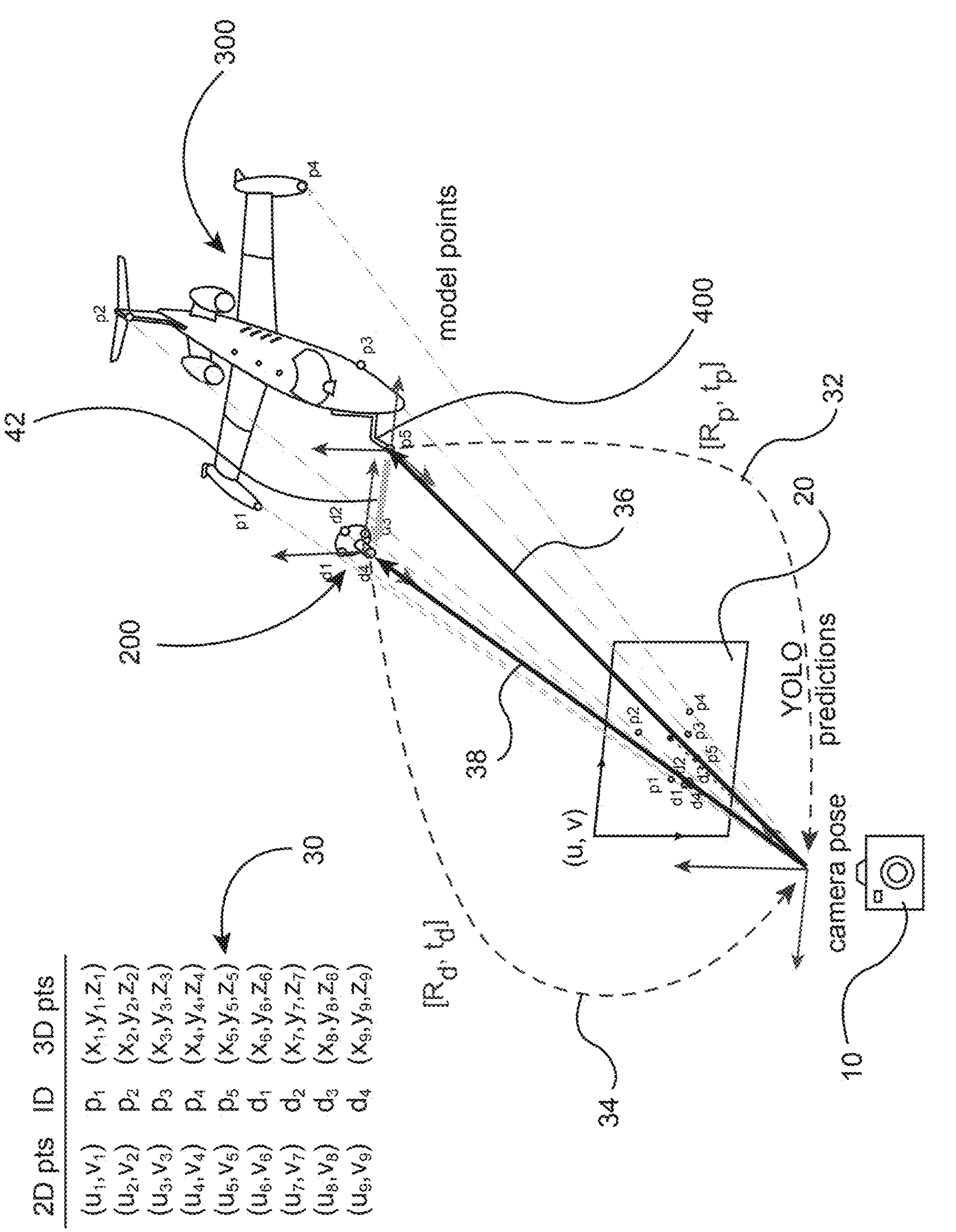
FIG. 19 is a schematic representation showing components and steps of an example method and system of the disclosure.

Referring now to FIG. 19, the method of the system described above with respect to FIG. 8 is now described with additional detail step-by-step. The camera 10 captures an image 20 containing at least two objects, a probe 400 and a drogue 200. For all experiments of the example embodiment, a YOLO model2 was chosen with a relatively low-resolution input size of 864×864, forcing resizing and padding of the 2K images generated by the virtual cameras prior to YOLO accepting them as input during inference time. This configuration resulted in sufficient model performance while maintaining real time execution. All simulations, image labeling, training, and experimentation of the example embodiment took place on a laptop with the platform configurations listed in Table 2, shown in FIG. 25.

YOLO was trained to detect 2D image points in 2D u, v coordinates, as shown in the table 30, which was also referred to schematically in FIG. 12. YOLO models can be trained to find 2D points and match them to corresponding to 3D geometric centers of distinct features. Model point matching was performed using YOLO, which can predict class IDs. In the example embodiment YOLO found objects and assigned each a class ID. It is understood that, given a square input image, YOLO makes predictions by dividing the image into grid cells at three different scales by dividing each side by 32, 16, and 8. It is believed that this enables scale invariant learning in which the network can predict bounding boxes surrounding small, medium, and large objects respectively. Subsequently, the network applies three different anchor boxes to each grid cell and outputs a prediction for each. Thus, YOLO makes P predictions on a square image with s pixel side lengths, where:

$$P = 3\left[\left(\frac{s}{32}\right)^2 + \left(\frac{s}{16}\right)^2 + \left(\frac{s}{8}\right)^2\right] = \frac{63s^2}{1024}$$

In turn, each prediction defines a bounding box comprising x, y, w, h, and c corresponding to its 2D center coordinate, width, height, and "objectness" (i.e., c, confidence) score respectively. Additionally, each prediction also includes a set of class probabilities, one for each learned object class. Hence, YOLO can output 45,927 predictions for each 864×864 input image. To obtain the predictions corresponding to the desired 80 trained features, objectness, class probability, and non-maximum suppression thresholds of 0.200, 0.250, and 0.200 respectively were applied. This quickly narrowed the search by filtering out any predictions with values below such thresholds. Of the remaining predictions, feature assignment based on highest class probability and only retain the highest objectness scoring prediction per class was perform. The bounding box (x, y) center coordinates as 2D feature image points were stored and matched by class ID to corresponding 3D model points. Any missing feature predictions were omitted from the list of 2D to 3D matches. The final output of this stage of the method and system is two lists of 2D to 3D matches, one for each of the two objects (e.g., probe and drogue) observed in the image.

Before computing poses from the matches derived from the method described above, the 3D local model reference frame points can be represented in a variety of different ways. To minimize the number of reference frame transformations needed in the method and system, we consider the receiving aircraft 300 and probe 400 as a single object, i.e., any point on the receiving aircraft 300 is considered a probe 400 point, and define the object origins as the probe 400 tip, drogue 200 center, and average drogue 200 center (relative to the tanker aircraft 100) for the receiving aircraft 300, drogue, and tanker aircraft 100 respectively.

The matches are passed to perspective-n-point (PnP) which uses the matches to align the 3D objects for pose estimation. To achieve the transformation, PnP—namely, OpenCV's RANSAC enabled cv::Solve PnPRansac method was chosen (OpenCV Team (2021) Open source computer vision library v4.5.5. URL https://opencv.org/opencv-4-5-5/). In addition to the feature matches from the previous method stage, the intrinsic camera parameters listed in Table 1 of FIG. 18 were supplied to enable 6DoF pose estimates based on the previous estimate, and set the iterations count, reprojection error threshold, and confidence threshold to 500, 4.0, and 0.9999 respectively. This method subsequently outputted each 6DoF pose estimate in the form of a Rodrigues rotation vector, rvec, and a z-forward translation vector, tvec defined relative to the camera. These outputs are indicated schematically at 32 as $[R_p, t_p]$ and at 34 as $[R_d, t_d]$ in FIG. 19 and produce a camera reference probe 400 vector 36 and a camera reverence drogue 200 vector 38.

Each object's resulting vector pair, rvec and tvec, 46 and 48, respectively, represents its estimated 6DoF pose in the camera's local reference frame for the probe and drogue, respectively. We convert the probe 400's rvec into a direction cosine matrix, $R^c_p$, which transforms probe 400 frame translation vectors, $t^p$, into camera frame vectors, $t^c$, indicated at 36, such that:

$$t^c = R^c_p t^p$$

Consistency was maintained with the reference frames described above as the camera frame z-forward tvec for both the probe and drogue into camera frame x-forward translation vectors, $t^c_p$, and $t^c_d$, were also converted. The receiving aircraft 300 frame PtD vector, i.e., probe to drogue vector, $t^p_d$ 50 (as depicted in FIG. 7) was obtained by first computing the camera frame PtD vector, $t^c_{p \to d}$, 42 in FIG. 19, by subtracting the camera frame probe vector 36 from the camera frame drogue vector 38:

$$t^c_{p \to d} = t^c_d - t^c_p$$

Therefore, the resulting pose estimations include a pair of rotation matrices and translation vectors defined relative to the camera 10. Specifically, in the context of the disclosed probe-to-drogue AAR, there is defined a first rotation matrix and translation vector 32 for the probe 400 that defines a camera frame probe vector 36, and a second rotation matrix and translation vector 34 for the drogue 200 that defines a camera frame drogue vector 38. Next the camera frame probe vector 36 is subtracted from the camera frame drogue vector 38 to produce a camera frame probe-to-drogue vector 42.

The camera frame probe-to-drogue vector 42 is rotated into the receiving aircraft's 300 local reference frame by the transpose of the probe's estimated rotation matrix. The transformation of the camera frame PtD vector, for example, as indicated at 42 in FIGS. 6 and 19, into the receiving aircraft 300 frame PtD vector 50, is achieved by multiplying the camera frame PtD vector 42 by the transpose of the probe's predicted direction cosine matrix:

$$t^p_d = t^p_{p \to d} = R^{c\ \top}_p t^c_{p \to d}$$

Solving results in a receiver frame probe to drogue vector 50. It is believed that by the theory of the method and system disclosed, an autonomous receiving aircraft 300 and tanker aircraft 100 pair can use these PtD vector predictions to synchronize flight and perform autonomous aerial refueling in real time. Table 3 in FIG. 26 shows the execution time for each method operation. In the example embodiment, image processing (rendering, padding, scaling, etc.) and making YOLO predictions occupied the majority of the method execution envelope. However, processing the current image and performing YOLO's forward propagation on the previous image in parallel reduced execution time between predictions to approximately 22 ms, or 45.5 fps. This speed has high potential to meet the real time execution requirements of AAR.

Open-source YOLO trains on labeled images, and after enough training, a YOLO model can find almost any distinct feature for which it was trained. Because YOLO outputs predictions in the form of bounding boxes surrounding 2D objects, often the models of the method and system are trained with labeled images generated with bounding box corrections specifically designed to align YOLO's predictions with the 3D geometric centers of strategically chosen features. That is, because the 2D points do not always correspond precisely to 3D points needed in the proposed relative vectoring method and system, sometimes the centers of these bounding boxes do not align with any particular 3D points. In an embodiment, bounding box corrections can be utilized to improve the operation of the method of the disclosure.

Figure 20:
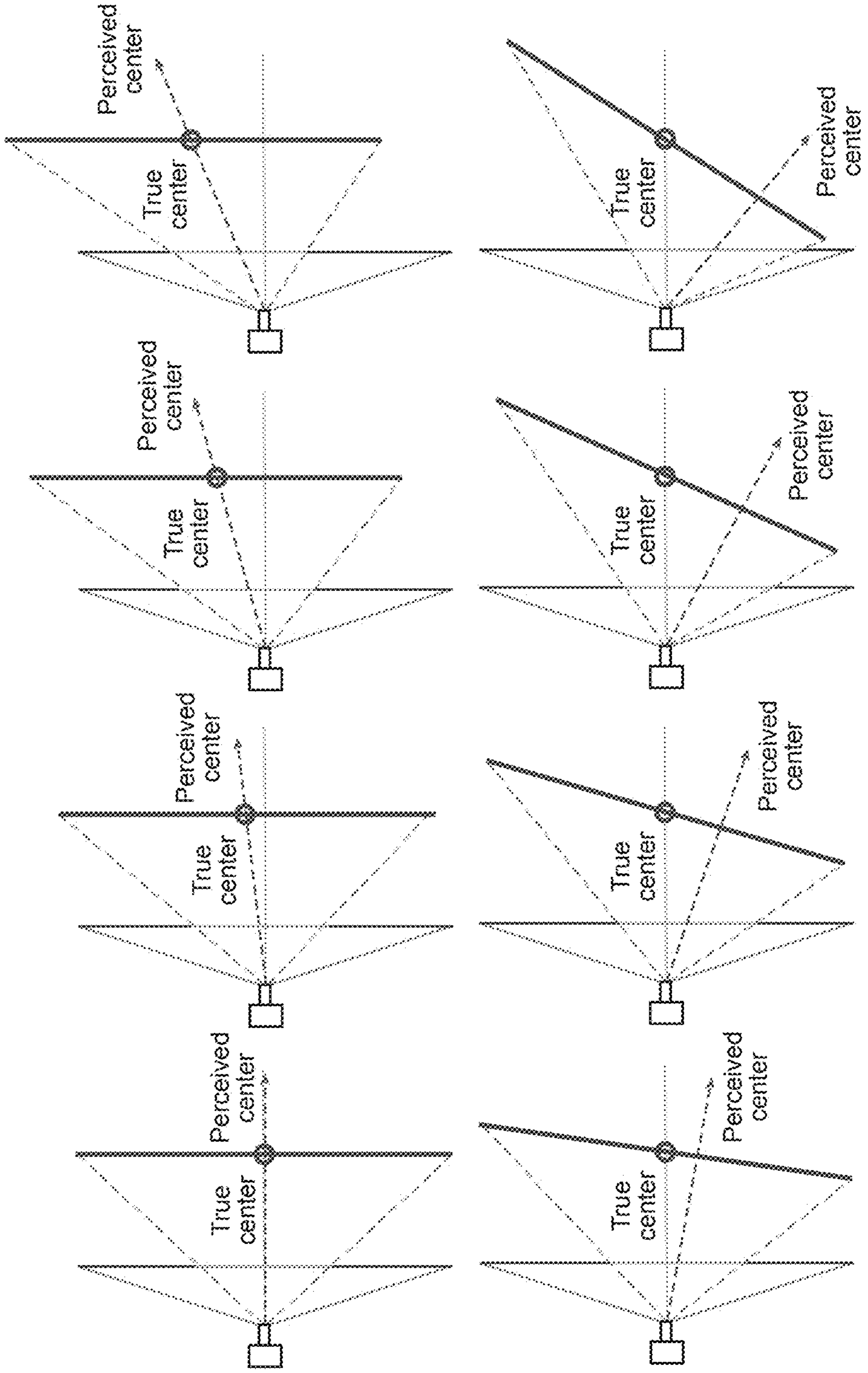
FIG. 20 is a diagram illustrating parallax disparity in projective geometry.

Bounding box corrections are beneficial because the center of an object in an image does not always project to that same center in the real world. The camera pinhole model can result in the entire surface of an object projected into an image being subject to skewing, even in cameras with no lens distortion. This phenomenon can be described as the parallax effect, which is due to the disparity in projective geometry between points closer to the camera's image plane and those further away. The diagrams in FIG. 20 demonstrate how the parallax effect causes the perceived object center, as viewed in the image, to diverge from the true 3D object center. Mere translation, as depicted in the top row of diagrams in FIG. 20, has no divergent effect since all points across the object's surface remain equidistant from the camera's image plane. In contrast, as depicted in the bottom row of diagrams in FIG. 20, rotation of the object has a dramatic effect, causing the perceived center to quickly diverge with even small distance-to-image plane disparities.

Figure 21:
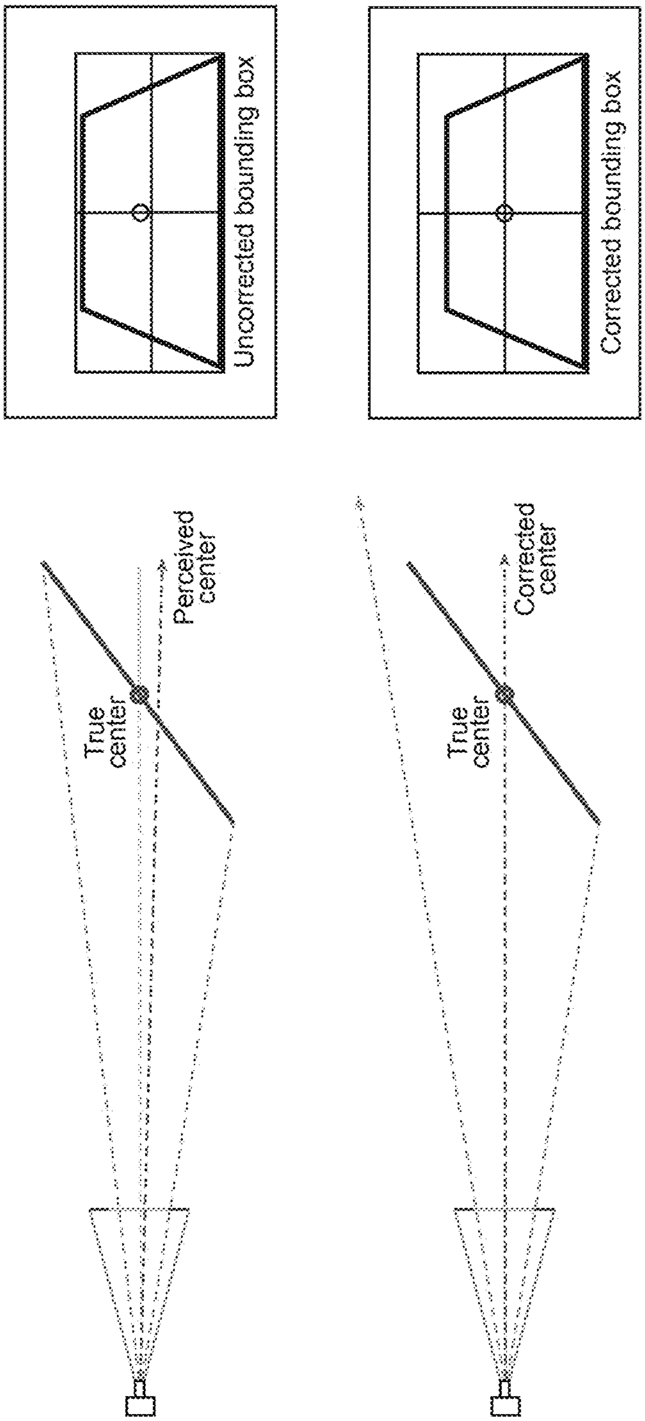
FIG. 21 is a diagram illustrating corrected training data for bounding box images.

To overcome the parallax effect and successfully train YOLO to find 3D center points in 2D images rather than perceived center points, corrected training data in the form of labeled images was fed to it and corrected, as shown in FIG. 21. Bounding box corrections align the perceived 2D center (i.e., original uncorrected bounding box center at the top, right) with the true 3D center. Corrected image labels, as depicted on the bottom right, allow YOLO to learn these corrections and accurately predict 2D points corresponding to 3D feature centers.

Figure 22:
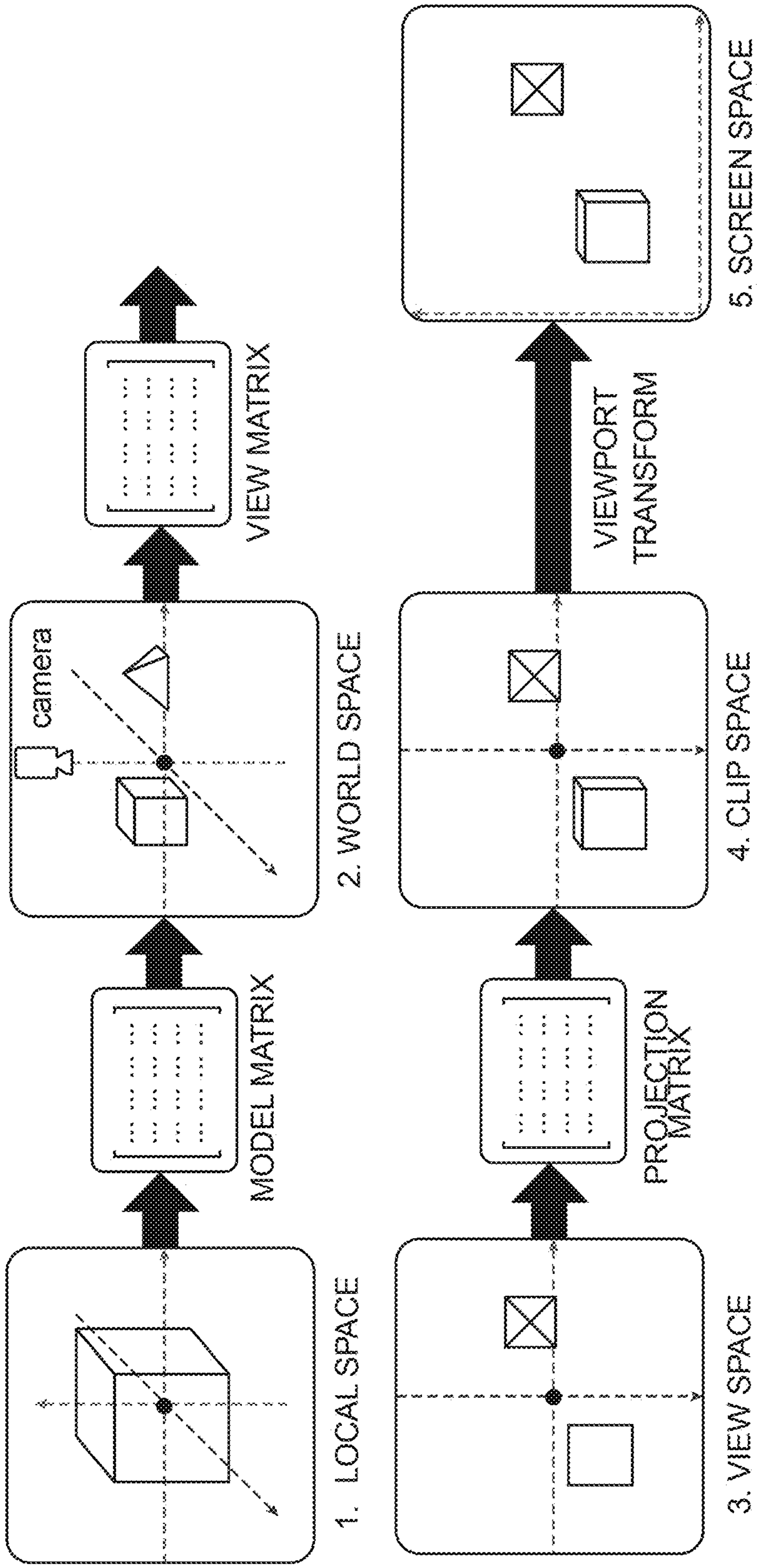
FIG. 22 is a schematic diagram of a process for establishing a 3D feature by selecting 3D points in the local model space surrounding such feature, then transforming the points to camera screen space.
Figure 23:
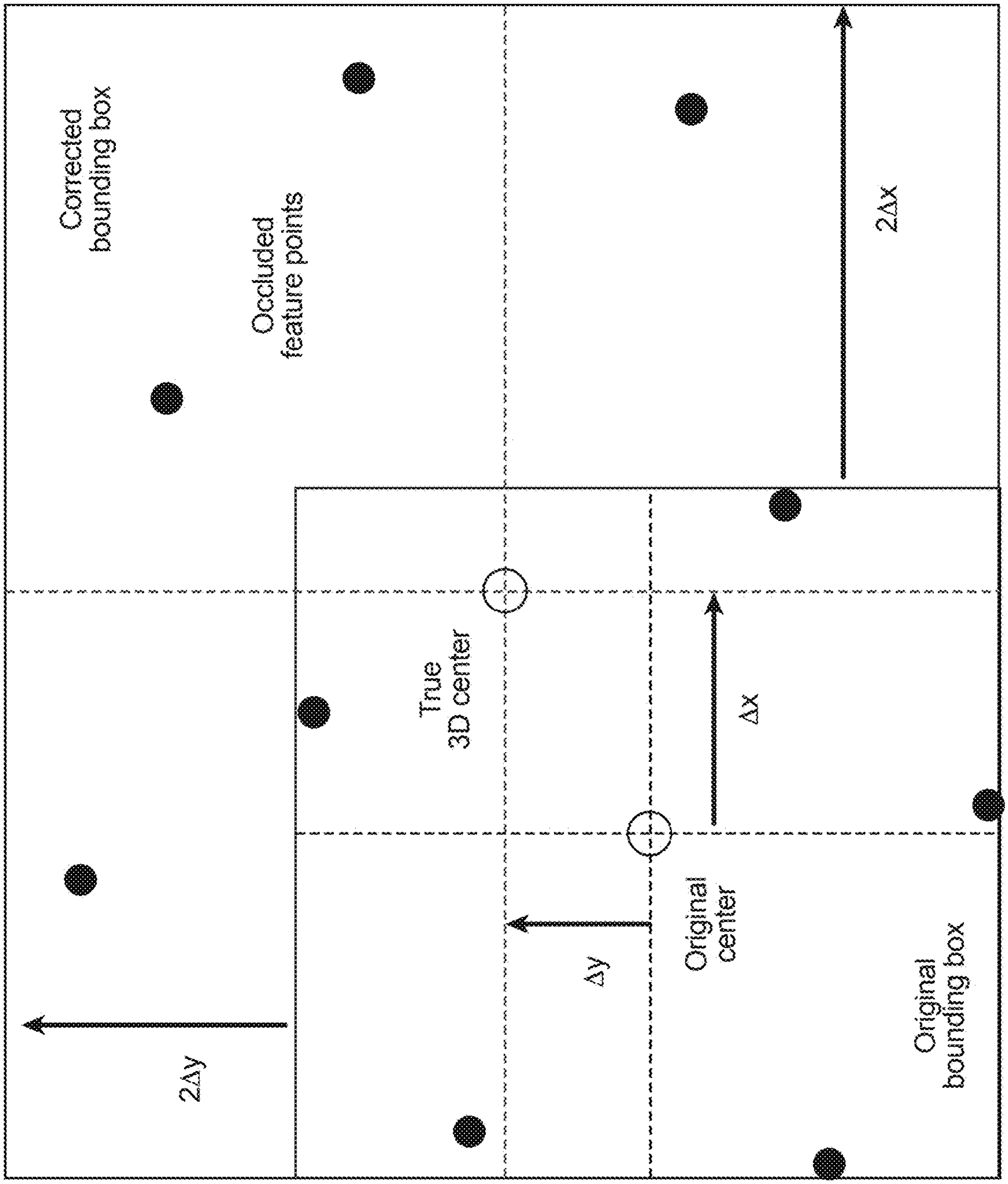
FIG. 23 is a diagram illustrating an example process for development of a bounding box.

Accurate and reliable label generation in simulation of 3D points to 2D points can be automated for reliability and accuracy, however manual labeling can also be utilized. Label generation can be achieved by establishing a 3D feature by selecting 3D points in the local model space surrounding such feature, then transforming the points to camera screen space (as described in the diagram of FIG. 22). Next, as depicted in FIG. 23, surround the corresponding projected pixel coordinates with the tightest fitting bounding box. This is accomplished by finding the maximum and minimum x and y values among all sensed points. Finally, grow the original bounding box by extending two adjacent sides outward such that the new bounding box center aligns with the feature's true 3D geometric center projected into the image. This step can be achieved mathematically by computing the differences in x and y components between the original and true 2D centers, $(\Delta x, \Delta y)$, then expanding the box toward the true 3D center projection by $2\Delta x$ and $2\Delta y$ along the corresponding adjacent sides respectively.

Figure 24C:
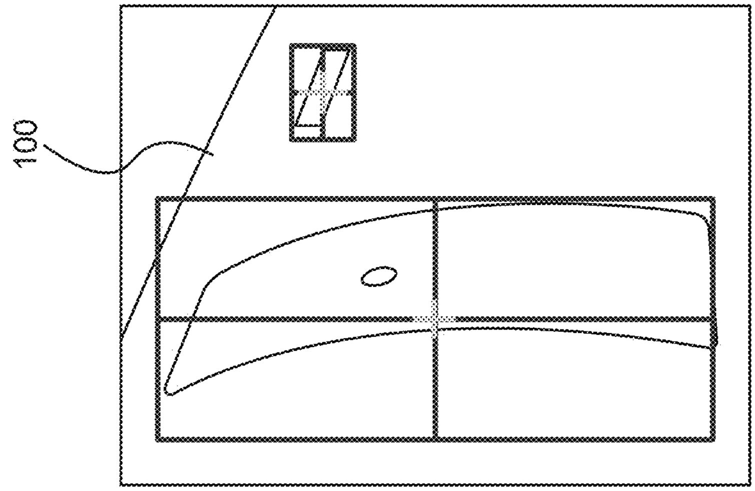
FIG. 24C is a third image in a series illustrating an example process for determining synthetic imagery.
Figure 24B:
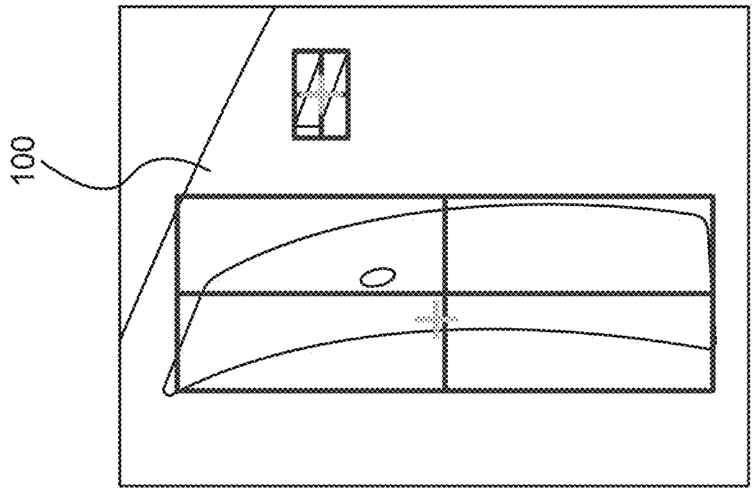
FIG. 24B is a second image in a series illustrating an example process for determining synthetic imagery.
Figure 24A:
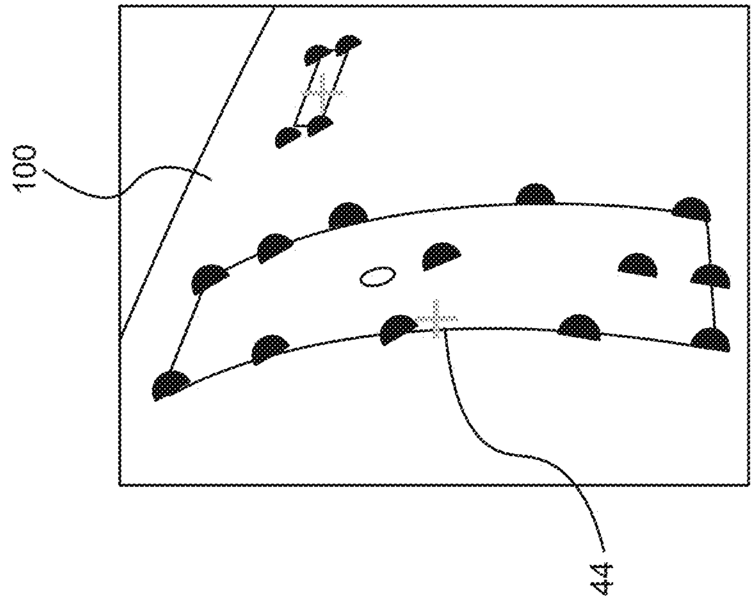
FIG. 24A is a first image in a series illustrating an example process for determining synthetic imagery.

An example of applying this process to synthetic imagery is depicted in FIGS. 25A-C. The crosshairs 44 coincide with image projections of true 3D feature centers—that YOLO can learn as 2D center points. In FIG. 24A, 3D model points representing tanker aircraft 100 features are selected. In FIG. 24B the tightest fitting bounding boxes surrounding the 2D image projections of those points. Note that in the middle image the bounding box centers do not align perfectly with the crosshairs 44. The final corrected bounding boxes are in FIG. 24C, and these bounding boxes and corresponding 2D points are the labels YOLO is trained with.

In the simulation of the method and system of the disclosure, some corrected bounding boxes were excluded. In an embodiment, image labels that extended near, e.g., withing 10 pixels, of the edge of the image frame. This exclusion prevented YOLO from learning partial features near the edge, since this could lead to bounding box predictions with centers misaligned with true 3D center projections. For example, it is sometimes impossible for YOLO to predict a bounding box with a 2D center outside the image frame, even if it is trained with partial bounding boxes containing centers outside the image frame. Instead, YOLO would sometimes interpret, learn, and later predict such partial features as whole features, resulting in incorrect bounding box centers and decreasing system accuracy when features appear near the image edges.

In the illustrated embodiment of the method and system, with the above image labeling method and the Monte Carlo simulated approaches, precise error-free labeling of thousands of high-resolution synthetic images were automated in a relatively short amount of time (approximately 30K images, each with at least 80 features, per hour). In the example embodiment, a process of data augmentation is included—a process that can enhance training deep learning models. In simulation, this process comprises an assortment of different lighting effects, backgrounds, orientations, vantage points, and occlusions. The resulting labeled images were further augmented (scale, mirror, crop, mosaic, etc.) using default settings within the Ultralytics YOLO training implementation. In the example simulation, the computer capabilities, as listed in the platform configuration of Table 2 of FIG. 25, limited the amount of 2K images able to be cached and stored in RAM. Thus, each dataset was limited to between 8,000 and 10,000 images, each labeled with at most 40 receiver/probe and 40 tanker aircraft/drogue features, i.e., 80 features total per image. An 80/20 training and validation data split was chosen and trained each model with 300 epochs and a batch size of 16.

It is noted that terms like "specifically," generally, "preferably," "commonly," and "typically" are not utilized herein to limit the scope of the claimed disclosure or to imply that certain features are critical, essential, or even important to the structure or function of the claimed disclosure. Rather, these terms are merely intended to highlight alternative or additional features that may or may not be utilized in a particular embodiment of the present disclosure. It is also noted that terms like "substantially" and "about" are utilized herein to represent the inherent degree of uncertainty that may be attributed to any quantitative comparison, value, measurement, or other representation.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

All documents cited in the Detailed Description of the Disclosure are, in relevant part, incorporated herein by reference; the citation of any document is not to be construed as an admission that it is prior art with respect to the present disclosure. To the extent that any meaning or definition of a term in this written document conflicts with any meaning or definition of the term in a document incorporated by reference, the meaning or definition assigned to the term in this written document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A method of determining a probe to drogue vector, comprising, providing a camera located to image a probe of a receiver aircraft and a drogue of a tanker aircraft;

capturing a 2D image with the camera, the 2D image including at least a portion of the probe of the receiver aircraft and at least a portion of the drogue of the tanker aircraft, wherein the probe is a refueling probe that exhibits a plurality of probe object features and the drogue is a refueling drogue that exhibits a plurality of drogue object features;

identifying a plurality of 2D image points on the 2D image, the 2D image points corresponding to 3D probe object features and 3D drogue object features;

matching some of the plurality of 2D image points with some of 3D probe object features to make probe matches and some of the 3D drogue object features to make drogue matches;

transforming the probe matches into a probe pose estimate defining a camera frame probe vector;

transforming the drogue matches into a drogue estimate defining a camera frame drogue vector; and subtracting the camera frame probe vector from the camera frame drogue vector to determine a camera frame probe to drogue vector.

2. The method of determining a probe to drogue vector of claim 1, wherein the camera is mounted on the tanker aircraft and further including the step of rotating the camera frame probe to drogue vector into the receiver aircraft's local reference frame to define a receiver aircraft probe to drogue vector.

3. The method of determining a probe to drogue vector of claim 1, wherein the matching step includes model point matching using class ID's.

4. The method of determining a probe to drogue vector of claim 1, wherein the transforming steps include the use of perspective-n-point analysis to align the probe and the drogue for pose estimation.

5. The method of determining a probe to drogue vector of claim 1, wherein the step of identifying a plurality of 2D image points includes performing bounding box corrections.

6. The method of determining a probe to drogue vector of claim 1, wherein the step of identifying a plurality of 2D image points on the 2D image utilizes machine learning.

7. The method of determining a probe to drogue vector of claim 1, wherein the camera is a forward-facing camera on the receiver aircraft.

8. The method of determining a probe to drogue vector of claim 1, wherein the camera is a rear-facing camera on the tanker aircraft.

9. The method of determining a probe to drogue vector of claim 1, wherein one of the tanker aircraft and the receiver aircraft is autonomous.

10. A method of determining an object-to-object vector, comprising, providing a camera on one of a first object having a first object docking member and a second object having a second object docking member;

capturing a 2D image with the camera, the 2D image including the first object docking member and the second object docking member;

identifying a plurality of 2D image points on the 2D image, the 2D image points corresponding to 3D features of the first object docking member and 3D features of the second object docking member;

matching some of the plurality of 2D image points with some of 3D features of the first object docking member to make first object matches and some of the 3D features of the second object docking member to make second object matches;

transforming the first object matches into a first object pose estimate defining a camera frame first object vector;

transforming the second object matches into a second object pose estimate defining a camera frame second object vector; and subtracting the camera first object vector from the camera frame second object vector to determine a camera frame first object to second object vector.

11. The method of determining an object-to-object vector of claim 10, wherein the first object is a probe, and the second object is a drogue.

12. The method of determining an object-to-object vector of claim 10, wherein the first object is an aerial boom, and the second object is a receiving port.

13. The method of determining an object-to-object vector of claim 10, wherein the first object is a ship's deck, and the second object is an item of cargo.

14. The method of determining an object-to-object vector of claim 10, wherein the first object is an electric vehicle, and the second object is a charging station.

15. The method of determining an object-to-object vector of claim 10, wherein the first object is an aircraft, and the second object is a runway.

16. The system of dual object localization and relative vectoring of claim 15, wherein one of the first 3D object and the second 3D object is part of an autonomous vehicle.

17. A system of dual object localization and relative vectoring, comprising, a camera, the camera positioned to capture a 2D image of a first 3D object exhibiting a first plurality of object features and a second 3D object exhibiting a second plurality of object features;

a computer vision object detection algorithm configured to identify a first plurality of 2D points on the 2D image of the first 3D object and match at least one of the first plurality of 2D points to at least one of the first plurality of object features, and to identify a second plurality of 2D points on the second 3D object and match at least one of the second plurality of 2D points to at least one of the second plurality of object features;

a Solve PnP algorithm configured to solve for a first pose estimation of the first 3D object and a second pose estimation of the second 3D object; and a computer programmed to determine from the first pose estimation a camera frame first object vector, from the second pose estimation a camera frame second object vector, and to subtract the camera frame first object vector from the camera frame second object vector to determine first object to second object relative vector.

* * * * *